(No Model.) 3 Sheets—Sheet 1.
J. H. BROWN.
RECOVERING VALUABLE CONTENTS FROM SUNKEN SHIPS.
No. 388,256. Patented Aug. 21, 1888.
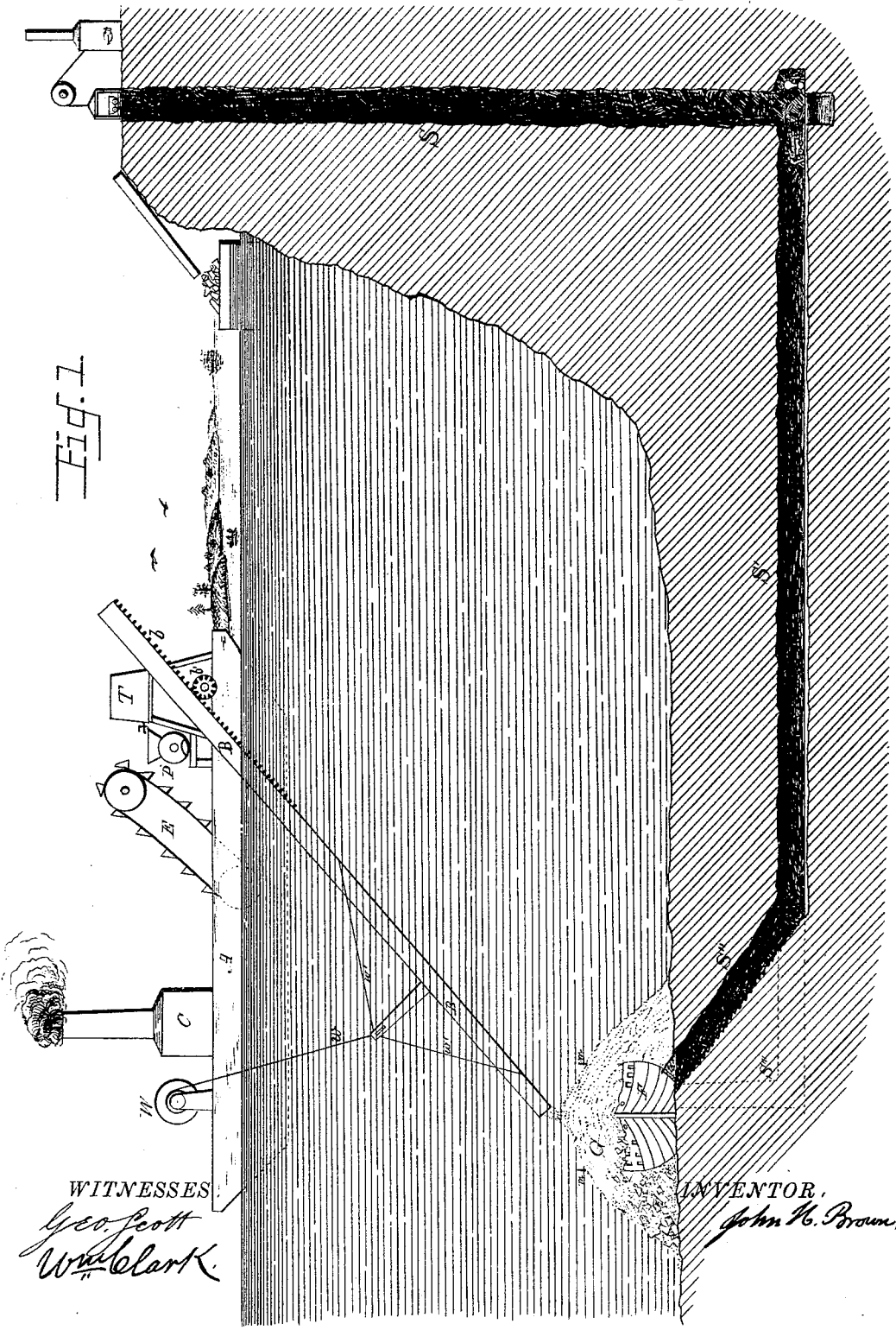
WITNESSES
Geo. Scott
Wm Clark
INVENTOR
John H. Brown

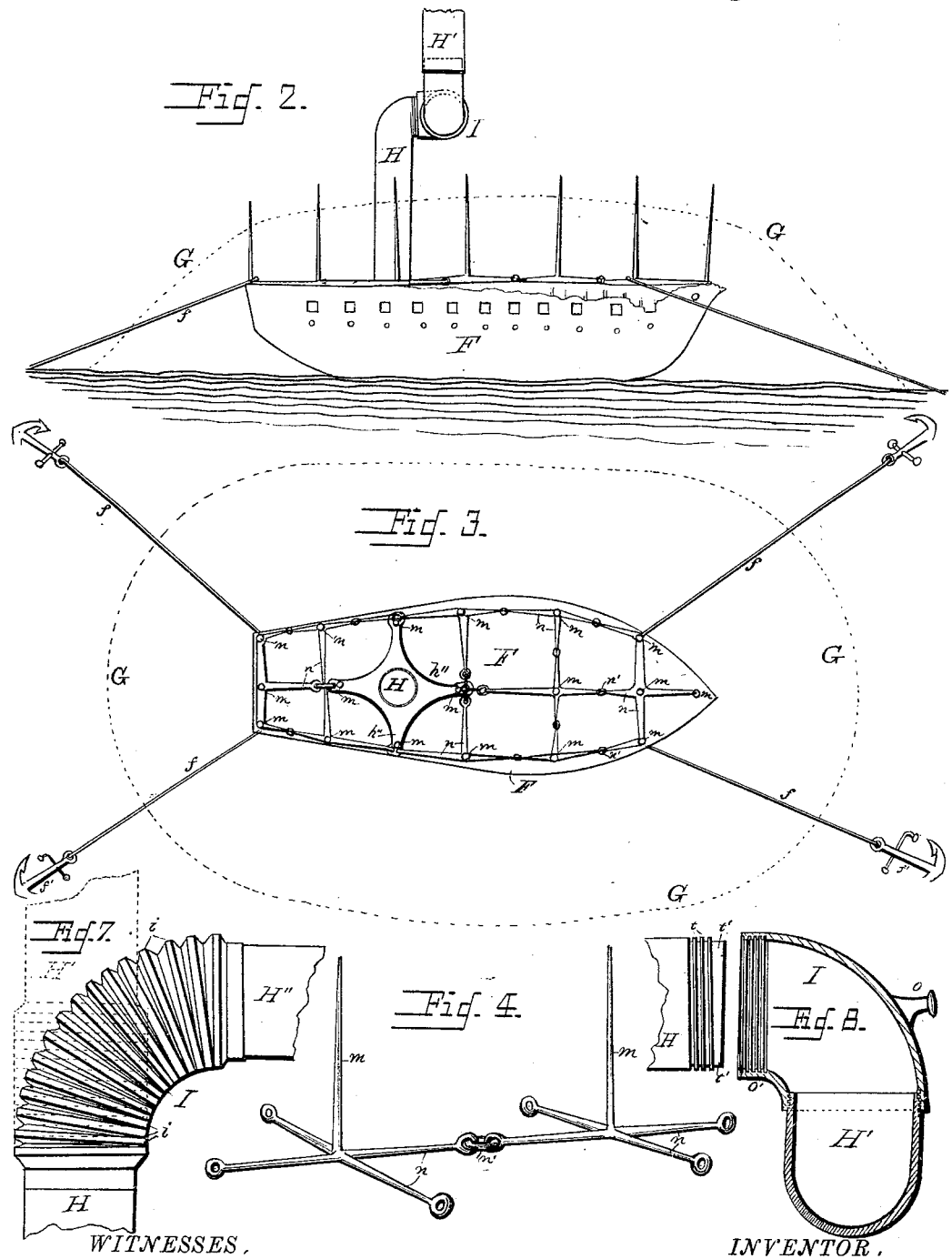

(No Model.) 3 Sheets—Sheet 3.
J. H. BROWN.
RECOVERING VALUABLE CONTENTS FROM SUNKEN SHIPS.
No. 388,256. Patented Aug. 21, 1888.
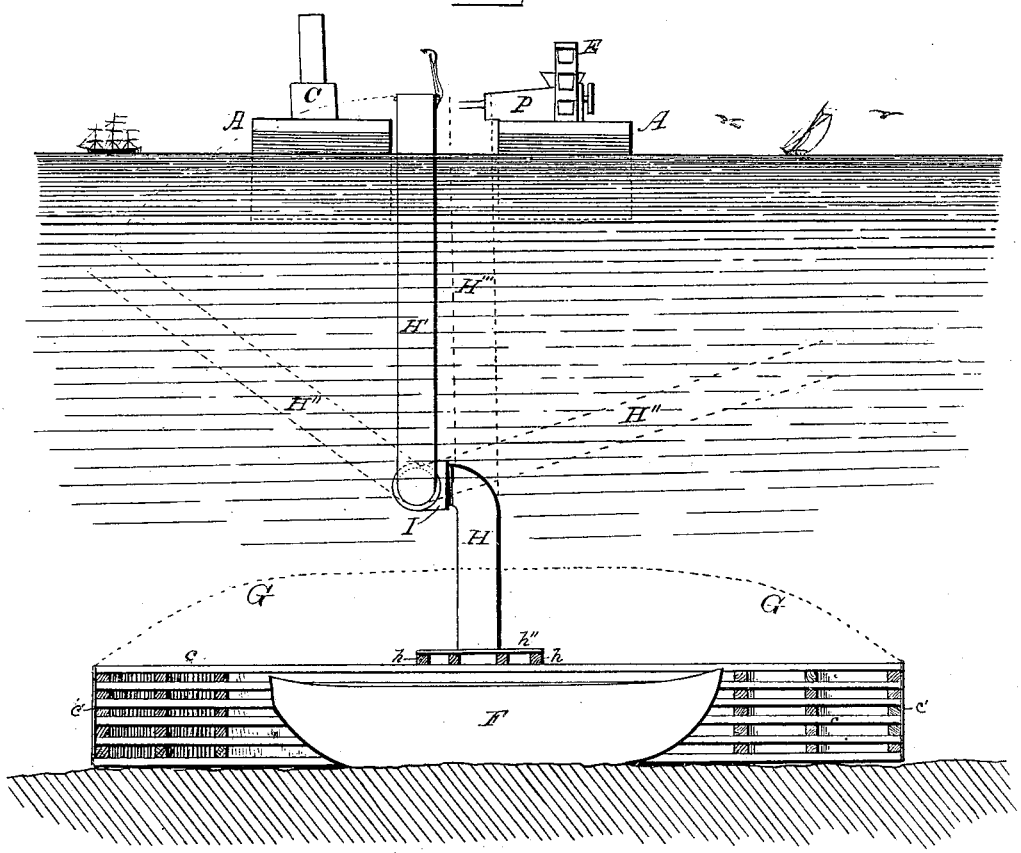
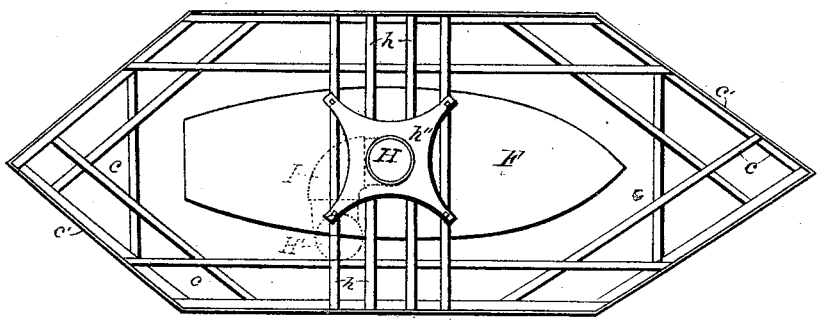
WITNESSES.
Geo. Scott.
W<sup>m</sup> Clark
INVENTOR.
John H. Brown.

UNITED STATES PATENT OFFICE.

JOHN H. BROWN, OF BALTIMORE, MARYLAND, ASSIGNOR TO MORGAN R. WISE, OF SALERO, ARIZONA TERRITORY.

RECOVERING VALUABLE CONTENTS FROM SUNKEN SHIPS.

SPECIFICATION forming part of Letters Patent No. 388,256, dated August 21, 1888.

Application filed January, 12, 1888. Serial No. 260,546. (No model.)

*To all whom it may concern:*

Be it known that I, JOHN H. BROWN, of Baltimore, in the State of Maryland, have invented a new and useful Method of Recovering Valuable Contents from Sunken Ships, which consists in incasing the ship in a monolith covering of béton, or other quick-setting hard water-proof cementitious composition, then tunneling from shore or adjacent still water through subaqueous rock beneath and up into the ship's bottom, or entering through its incased covering and removing the contents through such tunnel or entrance.

Heretofore when ships containing treasure or other valuable contents have been sunk in positions almost constantly subjected to swift-running tidal or other currents, so that diving-armor, caissons, and the various other appliances and methods heretofore known cannot be used successfully for either raising such ships or for gaining access to and removing contents from them, on account of the force of such currents; or where ships have been broken in two upon rocks or in collision, or torn open by explosions or torpedoes, or burned to the water's edge, it has frequently baffled all efforts to recover either the ship or its valuable contents.

The object of my invention is to provide means and methods by which the contents of sunken ships of the foregoing character or situations can be recovered from them where the ship itself cannot be raised nor its contents otherwise secured; and the invention consists in the method briefly stated in the first above paragraph, and in such variations therefrom as different circumstances and surroundings require to fully carry out my method in varying localities, which are more fully pointed out hereinafter and in the claims.

In order to specifically set forth and illustrate my method, I have chosen as an example the British thirty-two-gun frigate *Hussar*, the proudest ship afloat in its day, which was wrecked in its passage up through Hell Gate and sunk November 25, 1780, in seventy feet of water, less than one hundred yards off Port Morris, in what is now the northeasterly portion of New York city, a position almost constantly swept by very swift-running tides twelve fathoms deep. The *Hussar* was two hundred and six feet in length, fifty-two feet beam, and had on board nine hundred and sixty thousand pounds sterling in gold coin, equal to four million eight hundred thousand dollars. All efforts, continued off and on for one hundred years by the most capable men with the best-known appliances, have failed to either raise the ship or to recover from her hold her large treasure of gold coin, owing to the great strength of tides at all times at that point.

In the drawings, Figure 1 represents a vertical section through that side of the river and the adjacent bluff shore where the broken hulk of the *Hussar* still lies. Fig. 2 is a side elevation of a kind of linked net-work anchored over the sunken wreck, with a series of upwardly-projecting posts or columns at intervals over the ship's deck, the objects of the uprights being to form a series of guide-stakes to indicate and to secure about a uniform depth of fill of béton, &c., (indicated by the dotted line G,) all over the ship. Fig. 3 shows a plan or top view of the same, the dotted line G indicating the outline to be filled to. Fig. 4 shows two of the guide-stakes in perspective, each having a four-armed base linked to adjacent ones, so that while flexible as a whole, it settles down over the ship's deck, each upwardly-projecting stake or column being held in an upright position while being filled between with béton, &c. Fig. 5 shows a plan view of an inclosing-crib, which may be used, or not, to inclose the ship and the béton, its top when used serving instead of the connected guide-stakes shown in Figs. 2, 3, and 4. Fig. 6 shows a side view of a sunken ship with this inclosing-crib in longitudinal section, the dotted line G showing the distance to which the béton may be filled within and above the crib, the sheeting *c′* on the crib preventing it from spreading outside where not needed. Fig. 7 is an enlarged side elevation of a flexible section that may be used between the tubes H and H′ to give a straight tube when erect, instead of the rigid curved elbow I in the other figures. Fig. 8 is an enlarged view, partly in section, showing details.

Like letters show the same or equivalent parts in each figure.

After the position of the sunken ship is accurately located, the studded net-work or the crib is secured to fixed anchors or other fastenings by chains of such length that when lowered they will bring the net-work having the guide-stakes $m$ or the crib into proper position, as shown. Then a scow is anchored over the sunken ship the moment tide ceases to run between ebb and flow, preferably a double scow, or two scows secured together, with a space between through which to operate, and in which the chute B may be lowered to guide and deliver quick-setting béton, &c., to the proper place upon and around the sunken ship, the work being renewed and continued during every half-hour of still water between tides, or four times every twenty-three hours, until the whole ship is covered with a hard water-proof monolith casing of, say, five to ten feet thickness, or until it is sufficiently thick and strong to resist the pressure of the overlying water, when the water is exhausted from the incased ship, so that the external water-pressure is no longer balanced by like internal pressure. Then the shaft S, Fig. 1, is sunk in the adjacent rocky shore (far enough inland to be in solid material away from surface-fissures) to a perpendicular depth considerably below the bed of the river whereon the ship lies. Then a tunnel, S', is driven under said river-bed from the shaft to a point under or near the sunken ship, from which tunnel an inclined or vertical shaft, $S^2$ or $S^3$, is cut up under and through the ship's bottom to its interior, the inclosed water being drained and pumped out through the tunnel and shaft, when full, and safe access is had to all parts of the interior of the buried ship, and from which its contents can be safely and surely removed through said tunnel and shaft. If béton, &c., has flowed in through open hatches or rupture into the interior, so as to obstruct passage to any part of the ship or to prevent the removal of any treasure or other object, it may be dug out and removed, just as in mining. This generally, however, can be prevented by a diver adjusting some covering over such holes before the béton reaches them.

The distinguishing feature of my invention consists in burying the sunken ship in an embankment of artificial stone, rock, or monolith of such thickness and strength (proportioned to the depth of water) that it will withstand the full unbalanced pressure of water of that depth of sea or river where the sunken ship lies, then exhausting the inclosed water through a subaqueous tunnel or other entrance made into the ship, through which tunnel or other passage-way the contents of the ship may then be removed and without interference of tides or water. The inclosing artificial rock is preferably a quick-setting mortar or béton composed of hydraulic lime mixed with suitable proportions of sand and gravel, with or without broken or unbroken stone; or in some localities a cheap grade of strong plaster-of-paris may be used instead of hydraulic lime. The main requisites of the béton are that it must set or harden under water, and that in tide-washed localities (it being deposited during the intervals of still water) it must be sufficiently quick-setting to harden somewhat before the tide again runs fast enough to wash it away. To facilitate operations in the brief intervals of still water, the materials for the composition—lime or gypsum and the sand, &c.—may be mixed dry in proper proportions during the five hours of running tide on or in scows, which during the half-hour of still water are anchored over the sunken ship, and then the dry mixed materials, with the addition of sufficient water from tank T, are thoroughly mixed in a suitable pug-mill, P, or other mixer, which will mix and deliver a continuous stream of plastic mortar into the inclined trunk or covered chute, B, which conducts it down to the proper point of delivery without contact with or washing by the surrounding water until delivered to the point where it is to spread out and harden. The quick-setting varieties of hydraulic lime will set or harden under water in from fifteen to twenty minutes, and plaster-of-paris or gypsum in two or three minutes, after which they are not removed nor affected by tides, and further additions to the mass may be made between each ebb and flow until the requisite amount is secured in one continuous body of approximately uniform thickness over the ship and of strength sufficient for any requirements. By varying mixtures of lime and gypsum the length of time of setting or hardening may be varied at will. Only one part of the lime to three to five parts of sand is required, and where gravel and stone or rock is intermixed, or where the béton is flowed in as a filling of riprap, the quantity of cement is still further economized.

In the drawings, A represents two scows fastened together with an intervening space, through which the chute B may be lowered and raised by means of the cogged rack $b$ and pinion $b'$, and the chain $w$, connecting the chute B and windlass W. By this arrangement it will be seen that a very complete adjustment both lateral and vertical is secured, by which the lower end of the chute may be brought to any point necessary.

E represents an elevator or conveyer for delivering the dry material into the hopper of the pug-mill P, where it is mixed with the proper amount of water from the tank T and delivered into the chute B in a continuous stream, so that with sufficient power and force of men a large quantity—as fifty to one hundred tons—of composition can be mixed and delivered in proper position in a half-hour. A diver located at the lower end of the chute should direct and control the delivery of material, for which purpose he should be provided with suitable diving-armor, a submarine compass, an electric light, a telephone combined with the helmet and leading to the scow, flexible non-collapsible air-breathing tubes, suitably valved to admit only fresh air through one and to expel expired impure air through the other. Thus provided with compass and light, the diver is able to decide upon and direct by telephone the proper location and all movements of the lower end of the chute B to supply material to any point requiring it.

In order to enable the diver to determine the depth of filling all over the covered ship, and thus to intelligently distribute it over and around the ship, I have invented the system of guide-stakes m, Figs. 2, 3, and 4, each two or four armed base n linked to each other to hold them in an upright position, the length of the uprights m being sufficient to reach to or above the top of the required depth of fill, as indicated by dotted lines G.

Where the crib, Figs. 5 and 6, is used of a height about equal to the height of the ship's top, the fill may be made about to the top of the outer top edge of the crib, then sloping upward about as steep as it will lie without running over, as indicated by dotted line G, the crib in this way serving instead of the guide-stakes m. The crib should be made all open on top, on the inside, and on the bottom, except slats or scantling in the bottom, to hold rock to sink the crib. The outside should be sheeted with plank, c', to prevent the béton from flowing through and spreading outside, where it is not needed—a large saving of béton at the expense of timber for the crib.

When the crib is built and ready to sink into position around the ship, it should have, say, one thousand air-tight empty barrels or other casks lashed to it, so as to be quickly and easily loosened when sunk and located into its exact position, then loaded with just sufficient rock ballast to sink it, towed to the place, and lowered during still water into its position. Then when the barrels are all suddenly loosed the crib immediately has an unbalanced weight equal to one thousand barrels of water to hold it down, besides such anchorage as may be used to resist the next following tide before time is had for further filling of the crib or its inclosure; or the same end may be secured by the use of a number of suitably-rigged scows. Of course the crib may be made in two or more horizontal or other sections and sunk and filled one at a time until the proper height is reached.

In localities where driving a subaqueous tunnel is impractical from any cause, as distance from shore, or from shallow or still water where a coffer-dam is available, a section of large tube, H, of boiler-iron two to four feet in diameter, with a flanged base, $h^2$, may be used, its four wings being linked to the bases n of the guide-stakes m, to hold it in upright position until surrounded with filling of béton, as shown in Figs. 2 and 3; or it (H) may be bolted to cross-timbers h, secured to the top of the crib, where the crib is used. If the location be one where there is neither swift-running tides or other currents and where it may be protected from passing shipping, additional straight sections may be added, as indicated by dotted lines $H^3$, Fig. 6, to reach above water-surface in a straight vertical direction. Where strong currents or shipping endanger a rigid stand pipe, there should be a universal joint of some form made in the pipe just above the filling G. This joint may be of any form preferred, that shown in Figs. 2, 6, and 8 being cheap, simple, and reliable, but involves a compound curve. For it the lower section, H, and the upper section, H', each have a ninety-degree elbow, and each of these connects with a ninety-degree horizontal elbow, with coarse screw-threads, preferably square instead of triangular in cross-section.

To prevent the difficulty of getting the large-diameter screw to enter or "take" in deep water, I prefer to turn off the thread from the entering end, as shown at t', Fig. 8, so that portion of H will form a guide and enter elbow I before the threads t come in contact with I, thus easily bringing the threads t into the exact position to take into the thread in I when I is rotated, for which purpose a suspending-chain passes around the headed trunnion o in axial line with the end o', while another chain passes around the part o', through which rotation may be communicated to the elbow I to screw it onto section H. With this double joint, the section H' is free to turn down at any angle, as shown by dotted lines $H^2$, Fig. 6. Fig. 7 shows another form of flexible joint or section connecting the two sections H and H', which permits the upper tube, H', to turn over in any direction, but forms a straight tube or passage-way when erect. It is composed of a series of strong rings covered with very strong flexible fabric, &c., as used for fire-engine hose, and is well known in divers' suits.

If the ship lies on porous sand or gravel, and if it also has holes or leaks in its bottom where not reached and stopped by béton, so that water flows in on pumping out water after the béton covering is in place, then the tube $H^3$ (or the jointed section H') may be provided with the well-known air-lock, so that compressed air may be used to drive out the incoming and inclosed water, as fully set forth in my other application, Serial No. 267,440, when generally the hole or leak may be soon permanently stopped with béton or cement, so that thereafter the use of the air lock may be dispensed with.

If there be a coating of soft mud or yielding material around the ship, or such lodgment upon the lee side, it will of course be desirable to remove it before beginning the deposit of béton, so as to not deposit it upon such material as could not serve as an unyielding foundation for the monolith covering. Such soft loose material should first be removed, which may be done by an excavator of the agitating and suction type—for example, that described in my other application just referred to.

Where there are tidal or other currents strong enough to prevent the successful use of a caisson or of a large tube, H H', there is generally rock or other solid bed under the water, because such strong currents would wash away mud and sand, so that wherever currents prevent the use of tubes or stand-pipes the bottom is suitable for tunneling, and wherever the bottom is soft currents are not strong enough to prevent the use of stand-pipes, either with or without a flexible section.

In attempts to recover contents of ships, &c., by the use of diving-armor or caissons heretofore used, it is necessary to have the inclosing-shield made above water, instead of around the ship, large enough to cover the whole ship and projecting parts thereof, so that no support is secured from the ship itself or from the sea-bed inside of the inclosure, which requires the hood or shield to be so large that it is practically impossible to hold it in place against strong tides, or to make it of sufficient strength to sustain the great pressure of the large area of overlying water without the counterbalancing of the water within its inclosure or the substitution of compressed air to give the requisite pressure, and to expel the water which cannot otherwise be kept from coming in under the bottom edges of such hoods or caissons, while by my method the béton comes in direct contact with the whole top and sides of the ship and as far under it as there is any opening, and into all holes or leaks in the ship, by which all water can be wholly excluded where the ship lies upon rock or other impervious bottom, and the béton casing, by fitting close in around the ship, does not require to be near so large as a caisson with an inside large enough to inclose everything, for the masts, bowsprit, &c., may project through my covering and only be useful as a guide in making the filling around them to the proper depth and of proper distribution over the ship. Furthermore, by my invention the full strength of every rib and other timber in the ship is fully utilized to add to the strength of the béton covering, especially the portion of the masts below deck, which in their union with the béton become powerful supporting-columns for it, and in exactly the positions most needing support.

The word "ship" is used herein in its broad sense to include every kind of vessel and craft or other things sunk in water, and the word "béton" also to include all its forms and equivalents, as various materials and compositions may be used for covering the ship, &c.

Of course the shaft on shore may be sunk before or at the same time the ship is being covered, the rock from the shaft and tunnel being used to help cover the ship.

After the contents are removed from the ship, if there be any objection to the ship and covering remaining, as when in a navigable channel and near enough to the surface to be dangerous, a sufficient number of canisters of nitro-glycerine may be introduced into various parts of the interior of the covering, and all simultaneously fired by electricity to blow the whole thing into fragments, as in the well-known example of the tunneled rocks in Hell Gate.

I am aware that some of the appliances here shown, in the sense of their patentability, may be separate inventions from other equivalent features shown; but I have made no claims to them in this application, and only introduce them as a means sometimes necessary to enable others to carry out my method, under varying circumstances, in the cheapest and most certain manner.

Some of the apparatus here shown, together with other apparatus, I have shown, described, and claimed in my other application, Serial No. 267,440, filed March 16, 1888.

I am aware that tubular tunnels and sewers made in sections have been sunk in water and covered with béton, riprap, &c., as a protection to them and to hold them down in place, and that caissons of various kinds and forms have been built above water, launched, and sunk to the bottom to enable miners to excavate mud, &c., under the caisson, for the purpose of lowering the caisson to bed-rock; but, so far as I can learn, no one has ever practiced or conceived of my newly-invented method or process, it being the reverse of the foregoing.

I claim—

1. The method of recovering treasure or valuables lost at sea by enveloping or burying in its position under water the treasure or thing to be recovered in a strong water-proof crust or coating, then making an opening from above water-surface into said inclosing-coating, and removing the inclosed contents through said opening, substantially as described.

2. The method of recovering goods or treasure from deep water, which consists in covering or burying the same within or under a strong water-proof composition which will set or harden under water around and over the thing to be procured, then making an entrance into the incasing material from a point above water and removing the same through said entrance or passage-way, substantially as set forth.

3. The process of removing valuables from under water, which consists of covering and incasing the same in a strong water-proof covering, then tunneling under and into said covering and removing said valuables through said tunnel, substantially as set forth.

4. The herein-described method of recovering the contents from a sunken ship, which consists in forming a béton monolith covering over and around the ship, then opening a passage-way into said monolith and removing the inclosed contents of the ship through said opening, substantially as set forth.

5. The method of removing the contents of a sunken ship, which consists in first entirely incasing the ship with impermeable material, then making a passage way from above water into the ship and removing the contents of the ship through said passage-way, substantially as set forth.

6. The method of recovering the contents from a sunken ship, by first covering the ship with béton or its equivalent, then making a passage-way into said béton covering and ship and removing the contents of the ship through said passage-way, substantially as set forth.

7. The method of gaining entrance into and removing the contents out of a sunken ship, which consists in first entirely covering the ship with béton or its equivalent, then sinking a shaft on adjacent land or in adjacent water away from swift currents of water to a depth below the level of the river or sea bed, then tunneling to a point under or near the sunken and incased ship, then cutting up into the ship and removing its contents through said tunnel and shaft, substantially as set forth.

8. The method of procuring valuables sunk in water, which consists in inclosing the same in quick-setting cement during the successive intervals of still water between ebb and flow of tides, then making a passage-way into the inclosed space and removing said valuables through said passage-way, substantially as set forth.

9. The process of removing valuables from sunken vessels, which consists in incasing the sunken vessel in a monolith covering, making a passage-way into said monolith, exhausting the inclosed water therefrom, and then removing the other contents through said passage, substantially as set forth.

JOHN H. BROWN.

Witnesses:
GEO. SCOTT,
WM. CLARK.